(12) United States Patent
Shi et al.

(10) Patent No.: US 11,657,845 B1
(45) Date of Patent: May 23, 2023

(54) BEAM COMBINER FOR VCSEL ARRAY IN HAMR HEAD

(71) Applicant: Western Digital Technologies, Inc., San Jose, CA (US)

(72) Inventors: Norman N. Shi, Los Altos, CA (US); Takuya Matsumoto, San Jose, CA (US); Barry C. Stipe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/708,558

(22) Filed: Mar. 30, 2022

(51) Int. Cl.
*G11B 5/48* (2006.01)
*G11B 13/08* (2006.01)
*G11B 5/00* (2006.01)

(52) U.S. Cl.
CPC ...... *G11B 13/08* (2013.01); *G11B 2005/0021* (2013.01)

(58) Field of Classification Search
CPC .......... G11B 5/4866; G11B 2005/0021; G11B 5/6005; G11B 5/3912; G11B 2005/0032; G11B 5/314; G11B 5/4826; G11B 13/08
USPC .......................................... 360/59; 369/13.33
See application file for complete search history.

(56) References Cited

U.S. PATENT DOCUMENTS

| | | | |
|---|---|---|---|
| 6,717,970 B2 | 4/2004 | Marsh et al. | |
| 7,257,141 B2 | 8/2007 | Chua | |
| 8,077,557 B1 | 12/2011 | Hu et al. | |
| 8,107,326 B1 | 1/2012 | Hirano et al. | |
| 8,139,448 B1 | 3/2012 | Hirano et al. | |
| 8,259,539 B1 | 9/2012 | Hu et al. | |
| 8,675,455 B1 | 3/2014 | Krichevsky et al. | |
| 9,053,716 B1* | 6/2015 | Matsumoto | G11B 5/314 |
| 9,196,278 B1 | 11/2015 | Tatah et al. | |
| 9,953,670 B1 | 4/2018 | Mu et al. | |
| 10,061,088 B1 | 8/2018 | Peng | |
| 10,892,603 B2 | 1/2021 | Huang et al. | |

(Continued)

OTHER PUBLICATIONS

Bardinal et al. "Collective Micro-Optics Technologies for VCSEL Photonic Integration," Advances in Optical Technologies, 2011, vol. 2011, Article ID 609643, pp. 136-146.

(Continued)

*Primary Examiner* — Nabil Z Hindi
(74) *Attorney, Agent, or Firm* — Patterson + Sheridan, LLP; Steven H. VerSteeg

(57) ABSTRACT

The present disclosure generally relates to a magnetic recording head for a magnetic media drive. The magnetic recording head comprises a near field transducer (NFT), a vertical cavity surface emitting laser (VCSEL) device, and a waveguide structure coupled between the NFT and the VCSEL device. The waveguide structure comprises a plurality of waveguide channels and a multimodal interference (MMI) combiner coupled to the waveguide channels. One or more of a curvature, a path length, and a propagation length of each of the waveguide channels is optimized such that each waveguide channel is controllable, or otherwise phase coherent with adjacent waveguide channels. The VCSEL device is capable of emitting a plurality of lasers through the plurality of waveguide channels, and the plurality of lasers are phase coherent when input into the MMI combiner. The MMI combiner combines a power of the plurality of lasers, which is output to the NFT.

20 Claims, 14 Drawing Sheets

(56) References Cited

U.S. PATENT DOCUMENTS

| | | |
|---|---|---|
| 2003/0113063 A1 | 6/2003 | Liu |
| 2011/0279903 A1 | 11/2011 | Wiedemann et al. |
| 2012/0113770 A1 | 5/2012 | Stipe |
| 2014/0185980 A1 | 7/2014 | Lei et al. |
| 2014/0192417 A1 | 7/2014 | Chann et al. |
| 2015/0340051 A1 | 11/2015 | Tatah et al. |
| 2018/0373114 A1 | 12/2018 | Tanaka |
| 2020/0287351 A1 | 9/2020 | Gerlach et al. |
| 2021/0398556 A1 | 12/2021 | Stipe et al. |
| 2021/0398557 A1 | 12/2021 | Stipe et al. |

OTHER PUBLICATIONS

Goto et al. "Microoptical Two-Dimensional Devices for the Optical Memory Head of an Ultrahigh Data Transfer Rate and Density Sytem Using a Vertical Cavity Surface Emitting Laser (VCSEL) Array," Jul. 2002, Japanese Journal of Applied Physics, vol. 41, No. 7S, Part 1, No. 7B, pp. 4835-4840.

Goto et al. "Near-Field Evanescent Wave Enhancement with Nanometer-Sized Metal Grating and Microlens Array in Parallel Optical Recording Head," Aug. 25, 2004, Japanese Journal of Applied Physics, vol. 43, No. 8B, DOI: 5814.10.1143/JJAP.43.5814.

Hussain et al. "Heat assisted magnetic recording (HAMR) with nano-aperture VCSELs for 10 Tb/in2 magnetic storage density," Proc. SPIE 8639, Vertical-Cavity Surface-Emitting Lasers XVII, Mar. 13, 2013, pp. 863909-1-863909-6, https://doi.org/10.1117/12.2002782.

International Search Report and the Written Opinion for International Application No. PCT/US2021/033187 dated Aug. 3, 2021, 10 pages.

Shi et al. "Single-Mode Vertical-Cavity Surface-Emitting Laser Array With High Power and Narrow Far-Field Divergence Angle," IEEE Photonics Journal, vol. 5, No. 6, Dec. 2013, 1502508, DOI: 10.1109/JPHOT.2013.2287559, 9 pages.

Xun et al. "High-power in-Phase coherently coupled VCSEL array based proton implantation," Electronic Letters, Jul. 17, 2014, vol. 50, No. 15, pp. 1085-1086, DOI: 10.1049/el.2014.1298.

\* cited by examiner

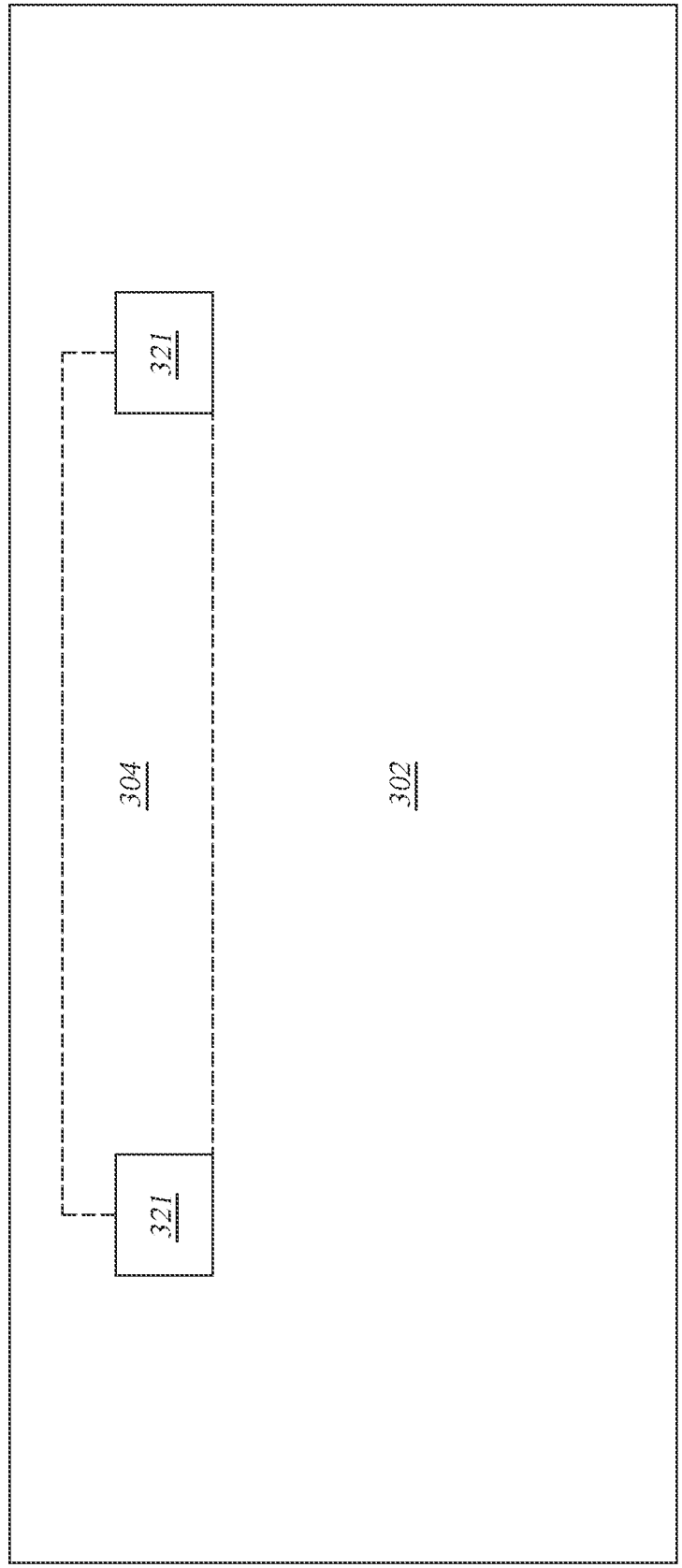

|   | PHASE (OUTPUT) | RELATIVE PHASE DIFFERENCE (RADIANS) | RELATIVE PHASE DIFFERENCE (DEGREES) |
|---|---|---|---|
| 8 | 4.5 | 2.4 | 136.7 |
| 7 | 2.1 | 1.6 | 90.1 |
| 6 | 0.5 | 0.8 | 44.9 |
| 5 | -0.3 | 0.0 | 0.0 |
| 4 | -0.3 | -0.8 | -44.9 |
| 3 | 0.5 | -1.6 | -90.1 |
| 2 | 2.1 | -2.4 | -136.7 |
| 1 | 4.5 |  |  |

*Fig. 4E*

BEAM COMBINER FOR VCSEL ARRAY IN HAMR HEAD

BACKGROUND OF THE DISCLOSURE

Field of the Disclosure

Embodiments of the present disclosure generally relate to a magnetic recording head for a magnetic media drive.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface of the recording medium. As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted recording technology to improve the recording density of a magnetic recording medium. In HAMR, a laser source is located next to or near the write element in order to produce heat, such as a laser source exciting a near-field transducer (NFT) to produce heat at a write location of a magnetic recording medium.

HAMR typically utilizes an edge emitting laser diode (EELD) as the light source. There are a number of issues with EELD such as the need to mount a sub-mount to a slider which increases cost, mode-hops that can suddenly change recording power and reduce HAMR HDD capacity, small diameter output beams such that there is little alignment tolerance, intense optical mode at the facet which can lower reliability, necessity for burn-in during manufacturing which increases costs, and a high profile on the slider which increases disk-to-disk spacing.

Therefore, there is a need in the art for an improved HAMR magnetic media drive.

SUMMARY OF THE DISCLOSURE

The present disclosure generally relates to a magnetic recording head for a magnetic media drive. The magnetic recording head comprises a near field transducer (NFT), a vertical cavity surface emitting laser (VCSEL) device, and a waveguide structure coupled between the NFT and the VCSEL device. The waveguide structure comprises a plurality of waveguide channels and a multimodal interference (MMI) combiner coupled to the waveguide channels. One or more of a curvature, a path length, and a propagation length of each of the waveguide channels is optimized such that each waveguide channel is controllable, or otherwise phase coherent with adjacent waveguide channels. The VCSEL device is capable of emitting a plurality of lasers through the plurality of waveguide channels, and the plurality of lasers are phase coherent when input into the MMI combiner. The MMI combiner combines a power of the plurality of lasers, which is output to the NFT.

In one embodiment, a magnetic recording head assembly comprises a main pole, a NFT disposed adjacent to the main pole at a media facing surface, a VCSEL device coupled to a top surface of the magnetic recording head assembly, the top surface opposite a media facing surface of the magnetic recording head assembly, and a waveguide structure coupled between the NFT and the VCSEL device, the waveguide structure comprising: a waveguide coupled to the NFT, a MMI combiner having a first end coupled to the waveguide, and a plurality of waveguide channels coupled to a second end the MMI combiner opposite the first end of the MMI combiner, wherein each of the plurality of waveguide channels has a different curvature such that each of the plurality of waveguide channels is phase coherent with adjacent waveguide channels.

In another embodiment, a magnetic recording head assembly comprises a main pole, a NFT disposed adjacent to the main pole at a media facing surface, a VCSEL device coupled to a top surface of the magnetic recording head assembly, the top surface opposite a media facing surface of the magnetic recording head assembly, and a waveguide structure coupled between the NFT and the VCSEL device, the waveguide structure comprising: a mode converter having a first end coupled to the VCSEL device, a MMI combiner disposed adjacent to the mode converter, a plurality of waveguide channels coupled between a first end the MMI combiner and a second end of the mode converter opposite the first end of the mode converter, wherein a path length of each of the plurality of waveguide channels is configured such that a phase of each of the plurality of waveguide channels is controllable, and a waveguide coupled between a second end of the MMI combiner opposite the first end of the MMI combiner and the NFT.

In yet another embodiment, a magnetic recording head assembly comprises a main pole, a NFT disposed adjacent to the main pole at a media facing surface, a VCSEL device coupled to a top surface of the magnetic recording head assembly, the top surface opposite a media facing surface of the magnetic recording head assembly, and a first waveguide structure coupled between the NFT and the VCSEL device, the first waveguide structure comprising: a plurality of first waveguide channels, each of the plurality of first waveguide channels having at least one of a different curvature and a different propagation length, wherein the VCSEL is capable of emitting a first plurality of lasers through the plurality of first waveguide channels, a first MMI combiner having a first end coupled to the plurality of first waveguide channels, wherein the first plurality of lasers emitted through the plurality of first waveguide channels are phase coherent when input into the first MMI combiner, and wherein the first MMI combiner combines a power of each of the first plurality of lasers into a first total power, and a first waveguide coupled to a second end of the first MMI combiner opposite the first end of the first MMI combiner.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

FIGS. 3A and 3B are schematic illustrations of a slider having a VCSEL mounted thereto according to one embodiment.

FIG. 4E illustrates a chart corresponding to the channels of FIGS. 4A-4D and their respective phases, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head for a magnetic media drive. The magnetic recording head comprises a near field transducer (NFT), a vertical cavity surface emitting laser (VCSEL) device, and a waveguide structure coupled between the NFT and the VCSEL device. The waveguide structure comprises a plurality of waveguide channels and a multimodal interference (MMI) combiner coupled to the waveguide channels. One or more of a curvature, a path length, and a propagation length of each of the waveguide channels is optimized such that each waveguide channel is controllable, or otherwise phase coherent with adjacent waveguide channels. The VCSEL device is capable of emitting a plurality of lasers through the plurality of waveguide channels, and the plurality of lasers are phase coherent when input into the MMI combiner. The MMI combiner combines a power of the plurality of lasers, which is output to the NFT.

Figure 1:
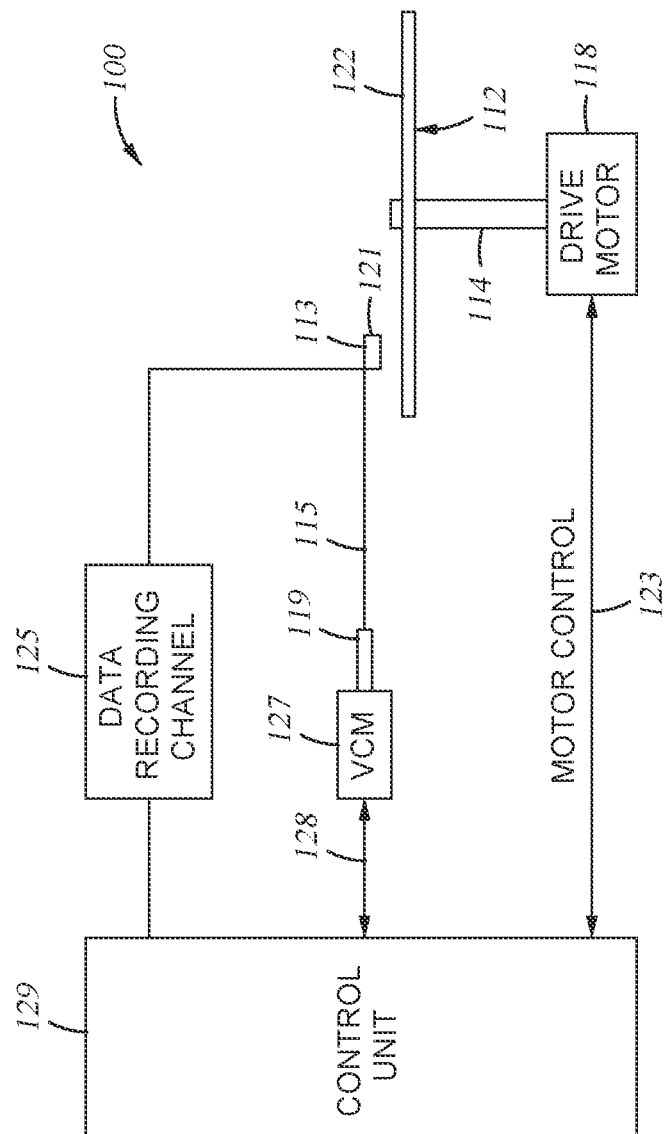
FIG. 1 is a schematic illustration of certain embodiments of a magnetic media drive including a HAMR magnetic write head.

FIG. 1 is a schematic illustration of certain embodiments of a magnetic media drive including a HAMR magnetic write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
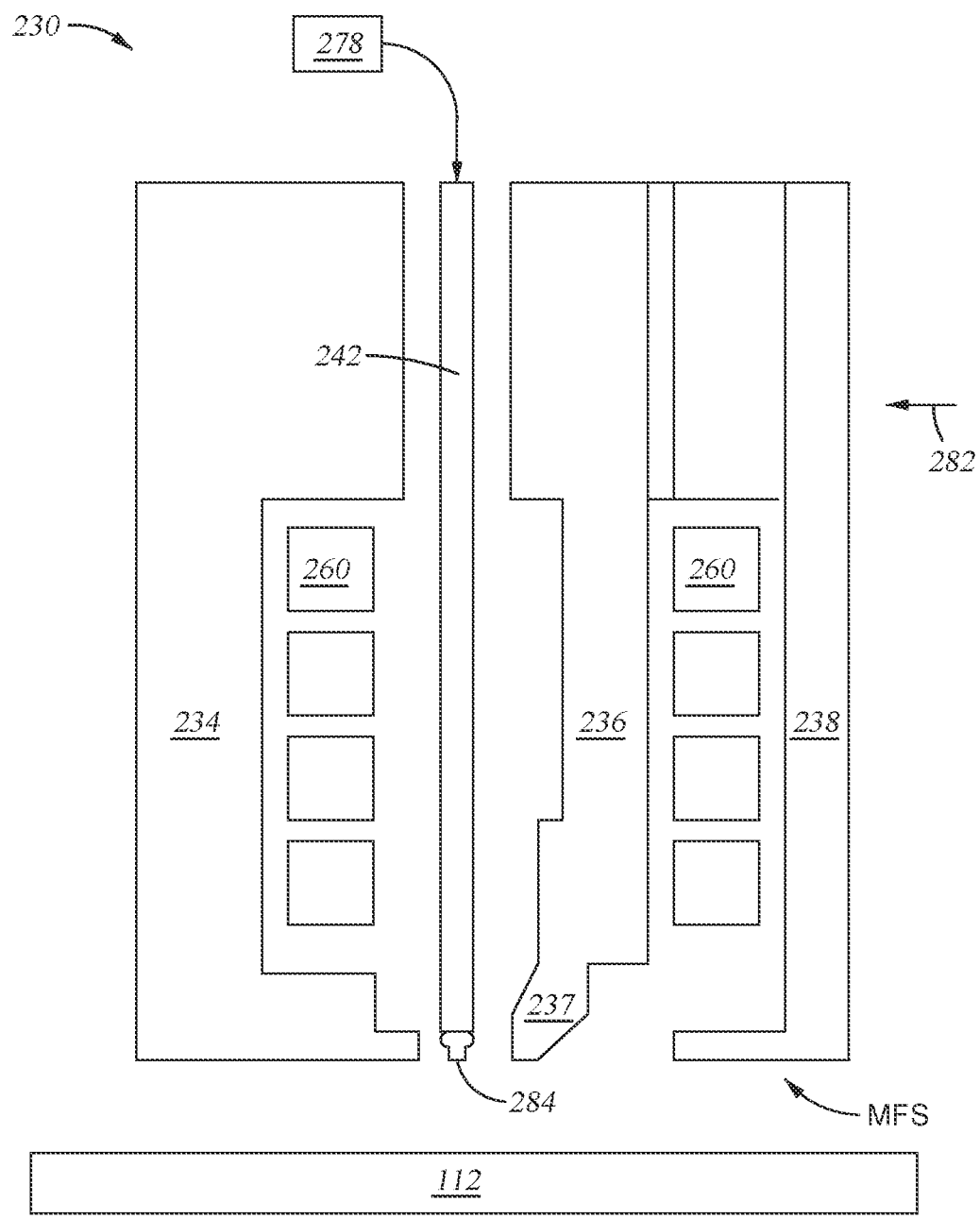
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return pole 234 and a trailing return pole 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading shield 234 and/or the trailing shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, a laser diode, or other suitable laser light source for directing a light beam toward the waveguide 242. Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS, concentrating electric charge at the tip of the NFT 284 which in turn capacitively couples to the magnetic disk and heats a precise area of the magnetic disk 112 by Joule heating. One possible design for the NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

Figure 3A:
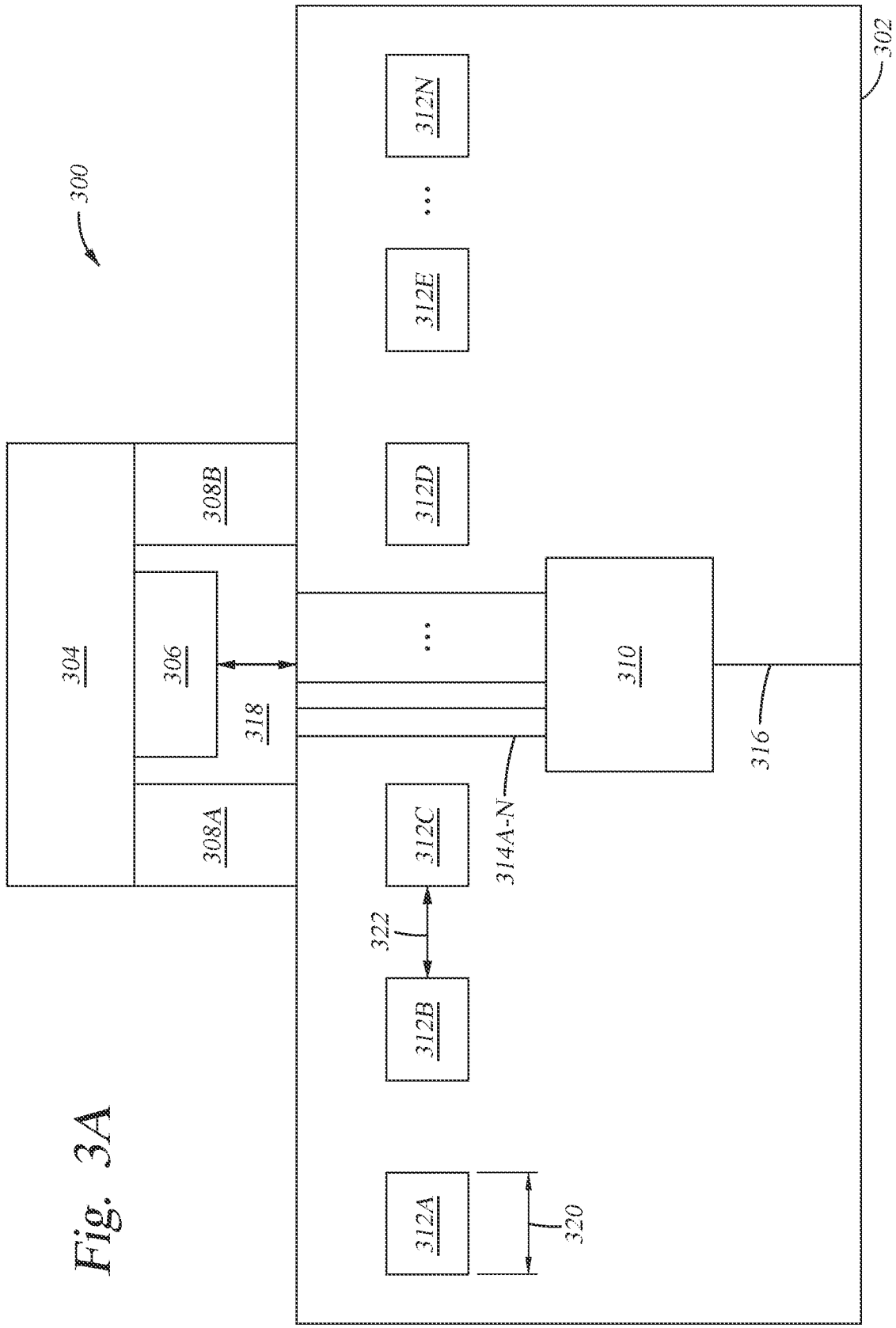

FIGS. 3A and 3B are schematic illustrations of a slider 302 having a VCSEL 304 mounted thereto, according to one embodiment. The slider 302 and the VCSEL 304 may be aspects of the magnetic media drive 100 of FIG. 1 or the HAMR write head 230 of FIG. 2. FIG. 3A shows a side view of the VSCEL mounted on the slider, while FIG. 3B shows a top down view of the same. The VCSEL 304 is mounted to the slider 302 via a first contact 308a and a second contact 308b in a first location as shown in FIG. 3B. In one embodiment, the VCSEL 304 is mounted on top of the slider 302, unlike an edge emitting laser diode (EELD) which typically needs to be first mounted to a sub-mount because it is difficult to bond the edge-emitting facet face of the laser directly to the top of the slider. The VCSEL 304 may have a minimal design structure, such that the dimensions of the VCSEL 304 may reduce the overall size of the HAMR write head. The VCSEL 304 includes a mesa 306 on a bottom surface of the VCSEL 304 facing the slider 302, where the mesa 306 is located between the VCSEL 304 and the slider 302.

In FIG. 3B, the VCSEL 304 is shown in phantom to provide better visibility to the electrodes 321 on the top surface of the slider 302. The electrodes 321 provide the electrical connection, via an electrically conductive soldering material, to the electrodes of the VCSEL 304. The electrodes 321, the soldering material, and the electrodes of the VCSEL 304 collectively form the first contact 308a and the second contact 308b. The electrodes 321 extend above the slider 302 by a distance of between about 1 micron and about 3 microns.

The VCSEL 304 is capable of emitting a plurality of lasers that correspond to a plurality of laser apertures of the mesa 306, where each of the plurality of lasers is aligned with the plurality of laser apertures of the mesa 306. Furthermore, the slider 302 includes a plurality of spot size converters 314a-314n that match the position and number of input lasers emitted by the VCSEL 304. The spot size converters 314a-314n extend from the top surface of the slider 302 facing the VCSEL 304. The mesa 306 is spaced from the top surface of the slider 302 by a first distance 318 of about 1 μm to about 20 μm. The mesa 306 includes a plurality of laser apertures, such as about 2 laser apertures to about 16 apertures. The previously listed values are not intended to be limiting, but to provide an example of an embodiment. The mesa is part of the VCSEL 304 chip and the apertures are on the surface of the mesa 306. The mesa 306 is an optional relief structure on the surface of the VCSEL 304.

The number of lasers mentioned above that the VCSEL 304 is capable of emitting matches the number of laser apertures of the mesa 306 as well as the number of spot size converters 314a-314n. Each laser, and hence each spot size converter 314a-314n is spaced apart by a second distance. The second distance between each of the spot size converters 314a-314n is about 2 μm to about 10 μm. Furthermore, each of the plurality of lasers emitted by the VCSEL 304 operates at the same frequency and are phase coherent. For example, adjacent apertures may be in-phase or out-of-phase with each other. Each laser of the plurality of lasers emitted by the VCSEL 304 has a power level of between about 1 mW to about 10 mW. The previously listed value is not intended to be limiting, but to provide an example of an embodiment. The plurality of lasers each has an active region (e.g., an area where the laser excited electrons). These active regions are spaced close enough to enable coupling and phase coherence to occur.

The slider 302 includes a plurality of bonding pad studs 312a-312n, such as about 2 bonding pad studs to about 32 bonding pad studs. The bonding pad studs 312a-312n have a first width 320 of about 25 μm, where the spacing 322 between adjacent bonding pad studs 312a-312n is about 32 μm. The previously listed values are not intended to be limiting, but to provide an example of an embodiment. The plurality of spot size converters 314a-314n are disposed at a location disposed between adjacent bonding pad studs 312a-312n. In the embodiment shown in FIG. 3A, the spot size converters 314a-314n are disposed between bonding pad studs 312c and 312d. Thus, in one example embodiment, all of the spot size converters 314a-314n need to fit within a linear distance of about 32 μm. Furthermore, the plurality of lasers, and hence, the plurality of spot size converters 314a-314n are linearly arranged. Each spot size converter 314a-314n is spaced about 2 μm to about 10 μm from the adjacent spot size converter 314a-314n.

Figure 4A:
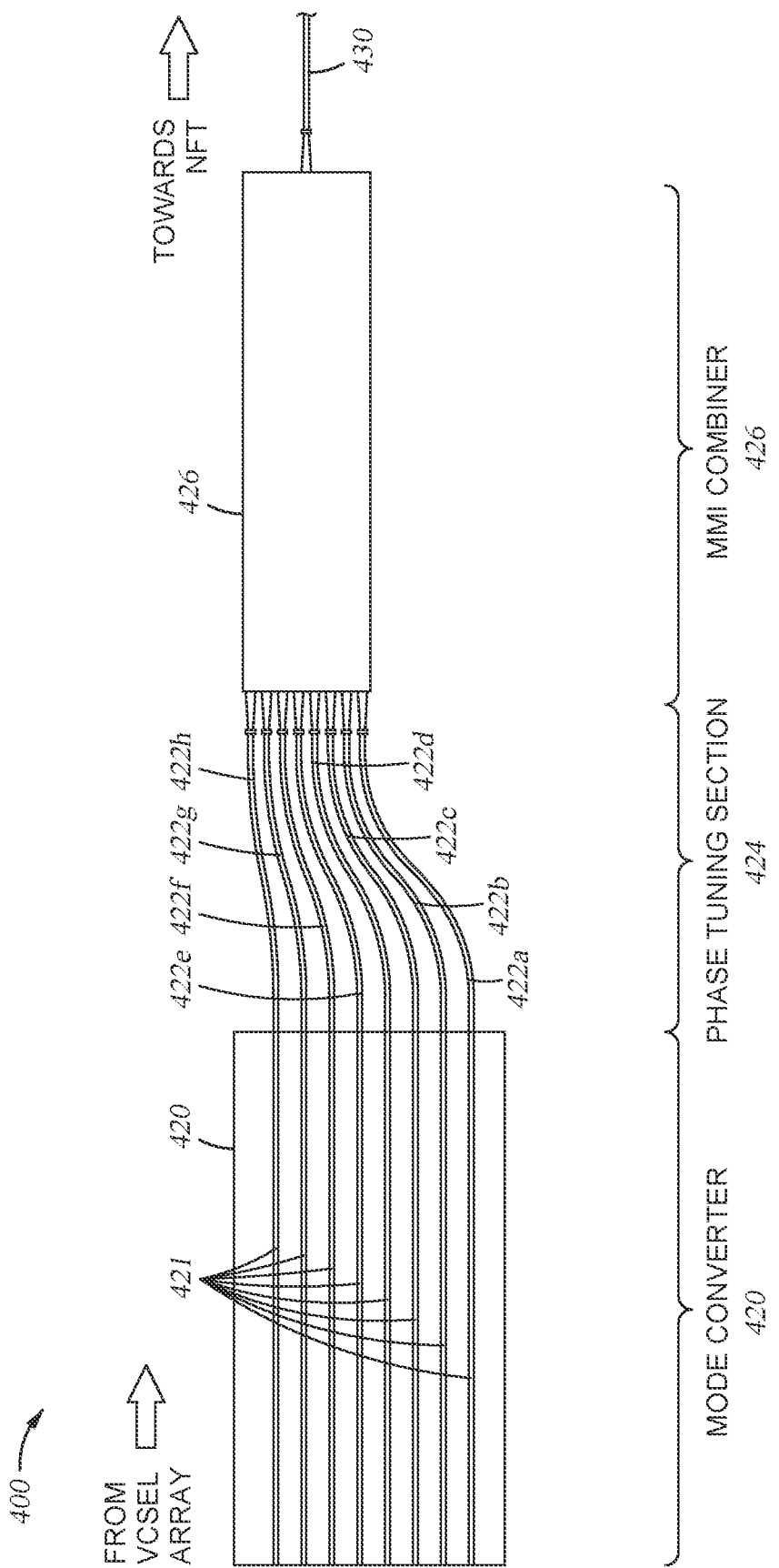
FIG. 4A illustrates a mode converter, phase tuning, and a multi-mode interference (MMI) combiner of a magnetic recording head 40 disposed between a VCSEL array and a NFT, according to one embodiment.
Figure 4B:
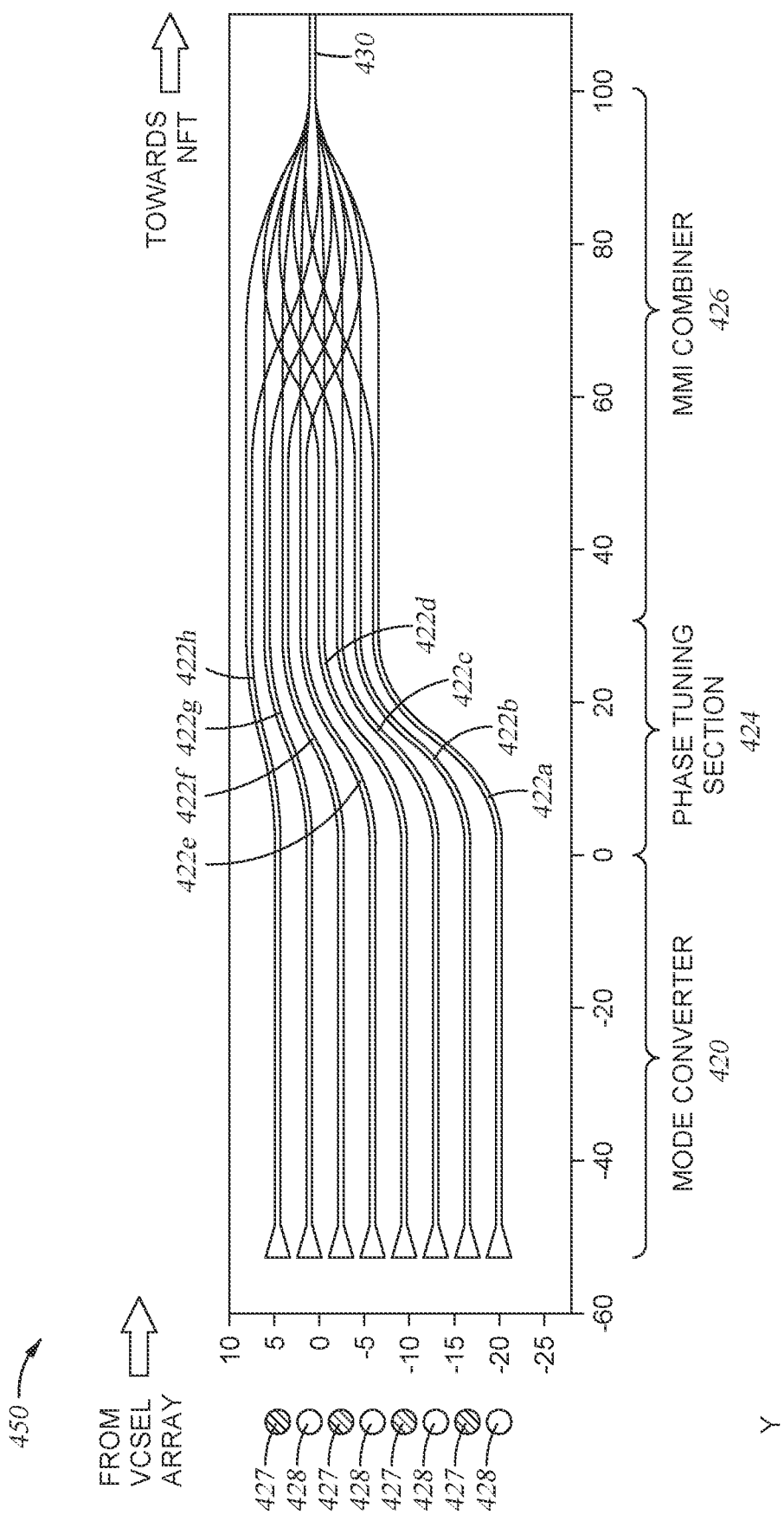
FIG. 4B illustrates the electric field profile of the mode converter, phase tuning, and the MMI combiner of the magnetic recording head of FIG. 4A, according to one embodiment.

The plurality of spot size converters 314a-314n feed into a multimode interference (MMI) device 310 that is disposed within the slider 302. The MMI device 310 combines the laser light fed from the output of the plurality of spot size converters 314a-314n at a first end, and emits a single laser through a single waveguide 316. The single waveguide 316 emits laser light from the MMI device 310 that includes the combined power of the plurality of input lasers from the plurality of spot size converters 314a-314n accepted by the MMI device 310. The single output mode is needed to properly concentrate the optical power and couple to the NFT. Proper operation of the MMI typically requires stable phase coherence between the inputs. FIGS. 4A-4B describe various ways of achieving stable phase coherence between the inputs of an MMI device.

FIG. 4A illustrates a mode converter 420, a phase tuning section 424, and an MMI combiner 426 of a waveguide structure 400 disposed between a VCSEL array and a NFT, according to one embodiment. FIG. 4B illustrates the electric field profile 450 of the mode converter 420, phase tuning section 424, and the MMI combiner 426 of the waveguide structure 400 of FIG. 4A, according to one embodiment. The waveguide structure 400 may be within the magnetic media drive 100 of FIG. 1 or the HAMR write head 230 of FIG. 2. The MMI combiner 426 may be the MMI device 310 of FIGS. 3A-3B. While not shown in FIGS. 4A-4B, the VCSEL array may be the VCSEL 304 of FIGS. 3A-3B.

A plurality of laser beams (illustrated in FIG. 4B) from the VCSEL (not shown) are input to a plurality of spot size converters 421 of a mode converter 420. The spot size converters 421 exit the mode converter as a plurality of waveguide (WG) channels 422a-422h. The plurality of laser apertures of the VCSEL array align with the plurality of spot size converters 421 and the plurality of WG channels 422a-422h. The plurality of waveguide channels 422a-422h may be referred to herein as channels 422, waveguides 422, or WG channels 422. While 8 channels 422 are shown, resulting in an 8×1 array (i.e., 8 channels disposed in one plane or one dimension), any number of channels 422 may be utilized, as discussed further below. As such, the number of WG channels 422 is not intended to be limiting. The mode converter 420 tunes the mode profile of each channel 422a-422h to allow for maximum coupling efficiency between the input laser beams. The spot size converters 421 and channels 422 through which the laser beams travel through exit the mode converter 420 to be phase tuned in the phase tuning section 424 prior to coupling to the MMI combiner 426. The MMI combiner 426 then combines the total power of each laser beam input before outputting a single powerful beam through a waveguide 430 into the NFT, like shown in FIG. 4B.

As further shown in the electric field profile 450 of FIG. 4B, each laser beam is phase tuned to be offset 180 degrees from adjacent laser beams. For example, WG channels 422a, 422c, 422e, and 422g all have a first phase 428. Channels 422b, 422d, 422f, and 422h all have a second phase 427 180 degrees offset from the first phase 428.

The phase tuning section 424 tunes the phase output of the laser beams to ensure the laser beams have stable phase coherency when input into the MMI combiner 426. To control and tune the phase of each WG channel 422, one or more of the curvature of each WG channel 422a-422h, the length of the optical path length of each WG channel 422a-422h, and the propagation length of each channel 422a-422h are varied. As such, each WG channel 422a-422h has a different curvature, optical path length, and/or total propagation length from one another, regardless of the number of channels 422 within the array. In some embodiments, the height and width of each WG channel 422a-422h may be tuned as well or may be predetermined. Furthermore, the beam diameter and the number of beam arrays may be optimized for maximum power, as discussed further below.

Figure 4C:
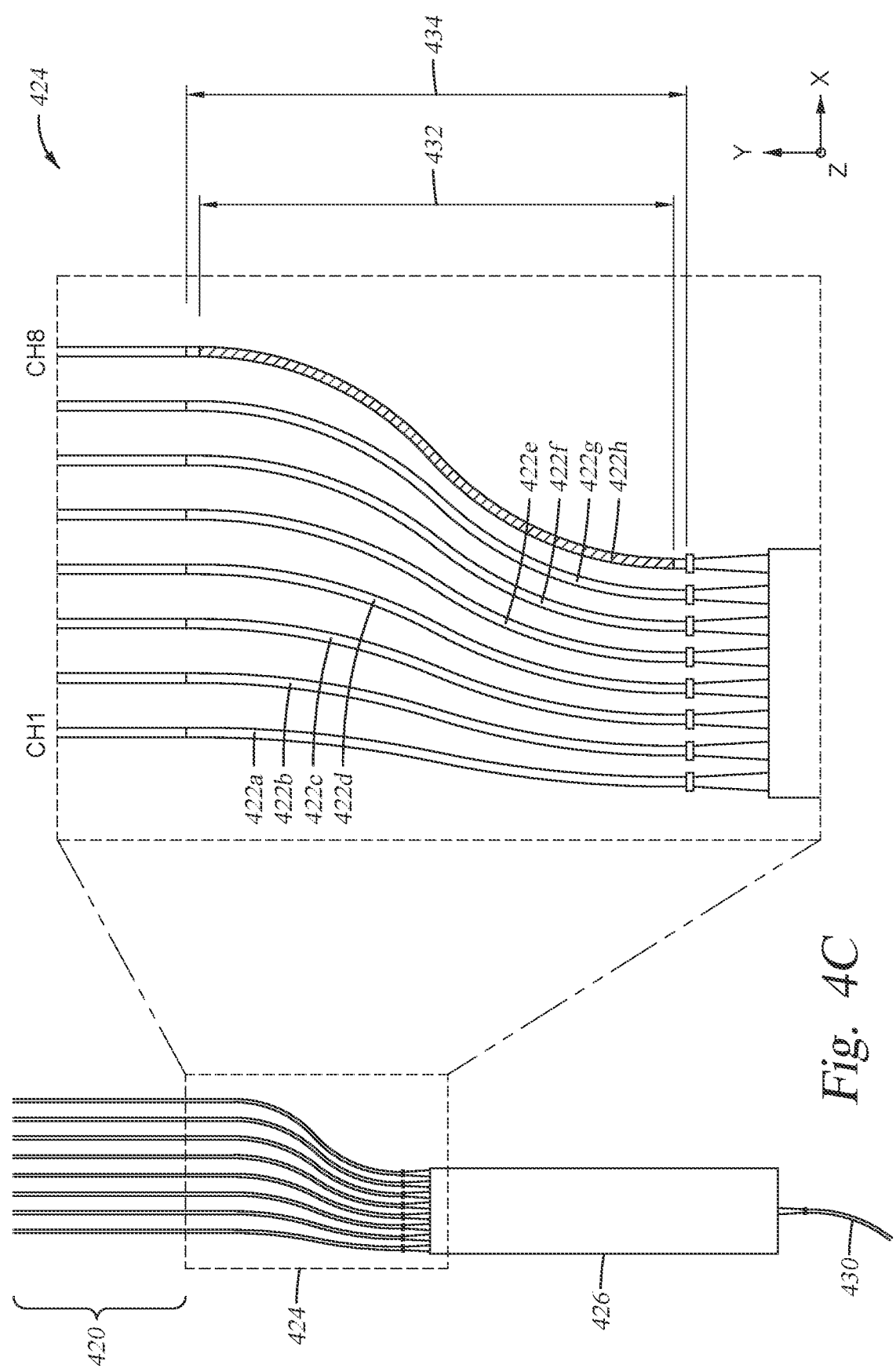
FIG. 4C illustrates an exemplary embodiment of how the channels of FIGS. 4A-4B are varied to achieve stable phase coherency, according to one embodiment.
Figure 4D:
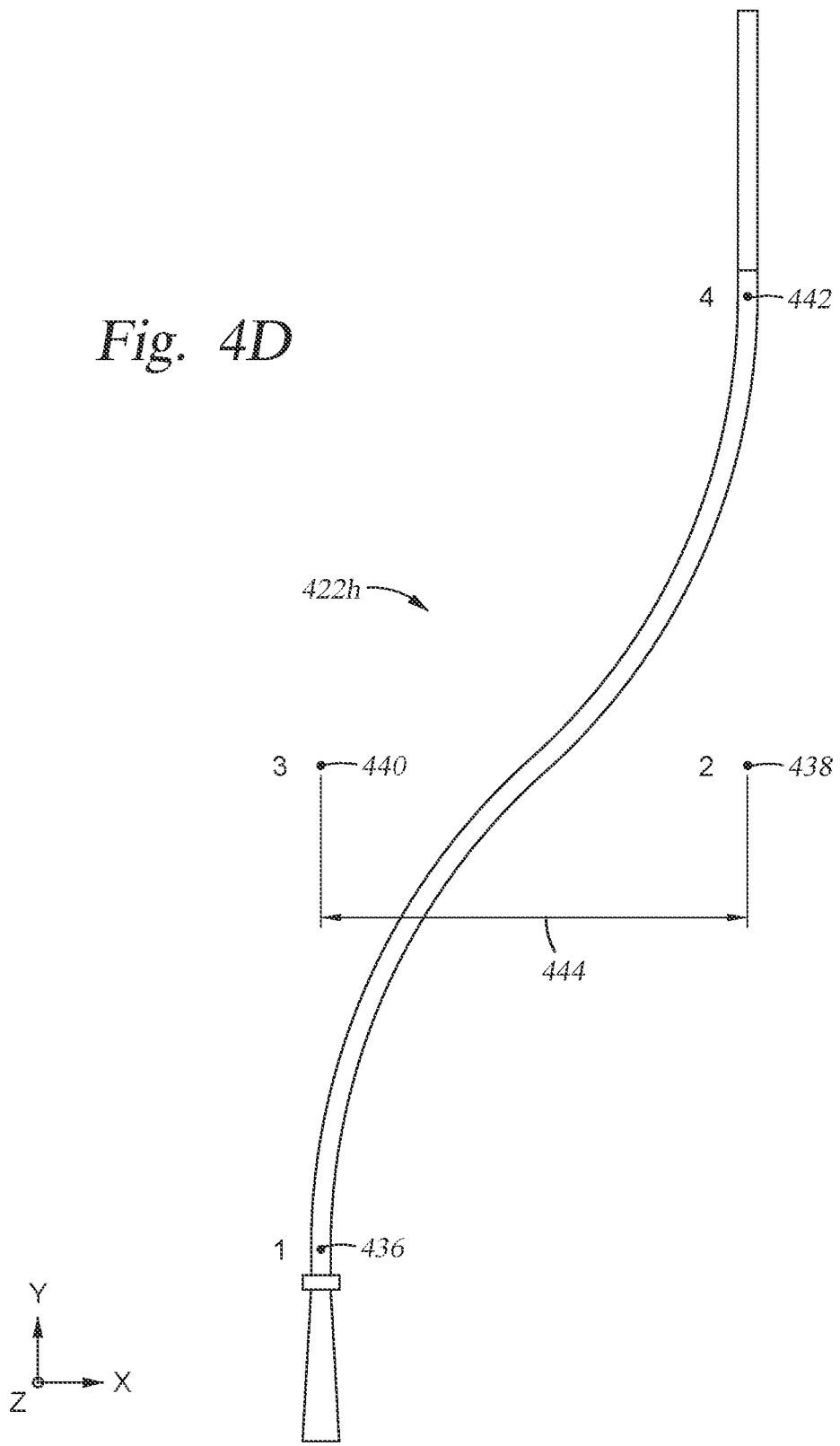
FIG. 4D demonstrates how the S-bend curvature of each channel of FIGS. 4A-4C is defined, according to one embodiment.

FIG. 4C illustrates an exemplary embodiment of how the channels 422a-422h are varied to achieve stable phase coherency, according to one embodiment. FIG. 4D demonstrates how the curvature, such as S-bend curvature, of each channel 422 is defined, according to one embodiment.

As shown in the example illustrated in FIG. 4C, one or more of the WG channels 422a-422h have a different optical path length and/or a different curvature, such as a different S-bend curvature. The optical path length may be referred to as a path length or an S-bend length, and is a total propagation length of each WG channel 422a-422h. The path length may vary due to the curvature or the S-bend curvature of each WG channel 422a-422h varying. For example, WG channels 422a-422h having a greater curvature will have a longer path length. The curvature may be referred to herein as an S-bend curvature. In some embodiments, each WG channel 422a-422h has a radius of curvature greater than about 20 μm.

For example, in FIG. 4C, channel 1 422a has an optical path length of about 32 μm, channel 2 422b has an optical path length of about 21.8 μm, channel 3 422c has an optical path length of about 24 μm, channel 4 422d has an optical path length of about 28.5 μm, channel 5 422e has an optical path length of about 25.5 μm, channel 6 422f has an optical path length of about 25.5 μm, channel 7 422g has an optical path length of about 26.7 μm, and channel 8 422h has an optical path length 432 of about 28.8 μm. Moreover, each of the channels 422a-422h may extend to a same overall spatial length 434 in the y-direction; however, the spatial length 434 of a WG channel may vary from the optical path length of the WG channel 422a-422h. For instance, channel 8 422h has an optical path length 432 of about 28.8 μm and spans a spatial length 434 of about 32 μm in the y-direction from the mode converter 420 to the MMI combiner 426. In other words, WG channels having a greater optical path length and/or a greater curvature have a greater total propagation length.

FIG. 4D shows how the curvature or S-bend curvature of each WG channel 422 is defined, according to one embodiment. While FIG. 4D shows only channel 8 422h, the curvature is defined the same for each channel 422. The S-bend curvature is defined using a four point Bezier curve. A first point 436 of the curve is at the bottom of the channel 422h near the location of where the WG channel 422h couples to the MMI combiner 426. A second point 438 and a third point 440 are near the center of the channel 422h. The second point 438 is disposed in the x-direction from the center of the channel 422h while the third point 440 is disposed in the—x-direction from the center of the channel 422h. A fourth point 442 is at the top of the channel 422h near the location of where the channel 422h exits the mode converter 420. In some embodiments, the first point 436 and the fourth point 442 are fixed and the second point 438 and the third point 440 are varied to increase or decrease a radius of curvature.

In channel 8 422h, the first point 436 is substantially aligned in the y-direction with the third point 440 and the second point 438 is substantially aligned in the y-direction with the fourth point 442. The second point 438 and the third point 440 are aligned in the x-direction. By varying the distance 444 between the second and third points 438, 440, the curvature may be increased or decreased. For example, the second and third points 438, 440 of channel 1 422a may be disposed closer together than the second and third points 438, 440 of channel 8 422h.

FIG. 4E illustrates a chart 475 corresponding to the WG channels 422 of FIGS. 4A-4D and their respective phases, according to one embodiment. For each of the eight channels 422a-422h, the first column 470 shows the phase output in radians, the second column 472 show the relative phase difference in radians between adjacent channels 422a-422h, and the third column 464 shows the relative phase difference in degrees between adjacent channels 422a-422h. For example, the phase difference between channel 1 422a and channel 2 422b is about −2.4 radians or about −136.7 degrees, the phase difference between channel 2 422b and channel 3 422c is about −1.6 radians or about −90.1 degrees, the phase difference between channel 3 422c and channel 4 422d is about −0.8 radians or about −44.9 degrees, the phase difference between channel 4 422d and channel 5 422e is about 0.0 radians or about 0.0 degrees, the phase difference between channel 5 422e and channel 6 422f is about 0.8 radians or about 44.9 degrees, the phase difference between channel 6 422f and channel 7 422g is about 1.6 radians or about 90.1 degrees, and the phase difference between channel 7 422g and channel 8 422h is about 2.4 radians or about 136.7 degrees. Thus, the phase of each laser beam traveling through the channels 422a-422h to the MMI combiner 426 is precisely controlled.

The phase output of each channel 422a-422h may be dependent upon the MMI combiner 426 specifications. For example, a width in the x-direction and a length in the y-direction of the MMI combiner 426 are optimized to ensure phase coherency between the laser beams and channels 422.

Figure 5:
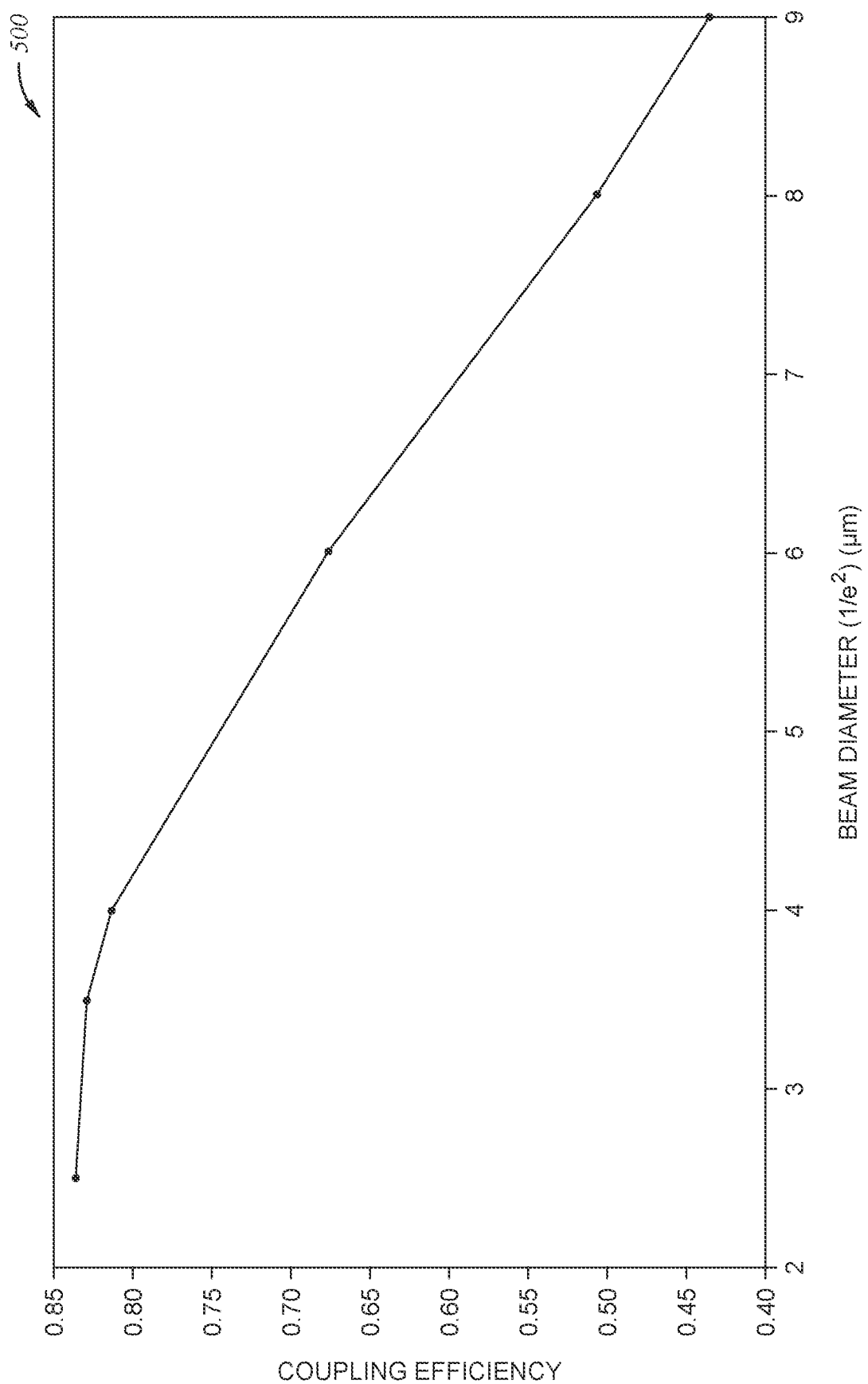
FIG. 5 illustrates a graph showing a coupling efficiency versus laser beam diameter in μm, according to one embodiment.

FIG. 5A illustrates a graph 500 showing a coupling efficiency versus laser beam diameter in µm, according to one embodiment. The graph 500 illustrates how varying the beam diameter of the laser beams effects the coupling efficiency of the magnetic recording head. As shown in the graph 500, a smaller beam diameter, such about 2.5 µm, about 3.5 µm, or about 4 µm, has a better coupling efficiency than larger beam diameters. However, larger beam diameters have more power per emitter.

Thus, as demonstrated by chart 475 and graph 500, the parameters of the VCSEL array, mode converter 420, channels 422a-422h, and MMI combiner 426 are each varied and optimized to ensure maximum waveguide power is output from the MMI combiner 426 through the NFT to a media.

FIGS. 6-9 illustrate different layout designs for a waveguide structure comprising the mode converter 420, channels 422a-422h, and MMI combiner 426, according to various embodiments. Aspects of FIGS. 6-9 may be used in combination with aspects of FIGS. 3A-5, or aspects of FIGS. 6-9 may be used in combination with one another. As noted above, each waveguide channel 422 in FIGS. 6-9 has a different curvature, path length, and/or total propagation length from one another, regardless of the number of channels 422 within the array.

Figure 6:
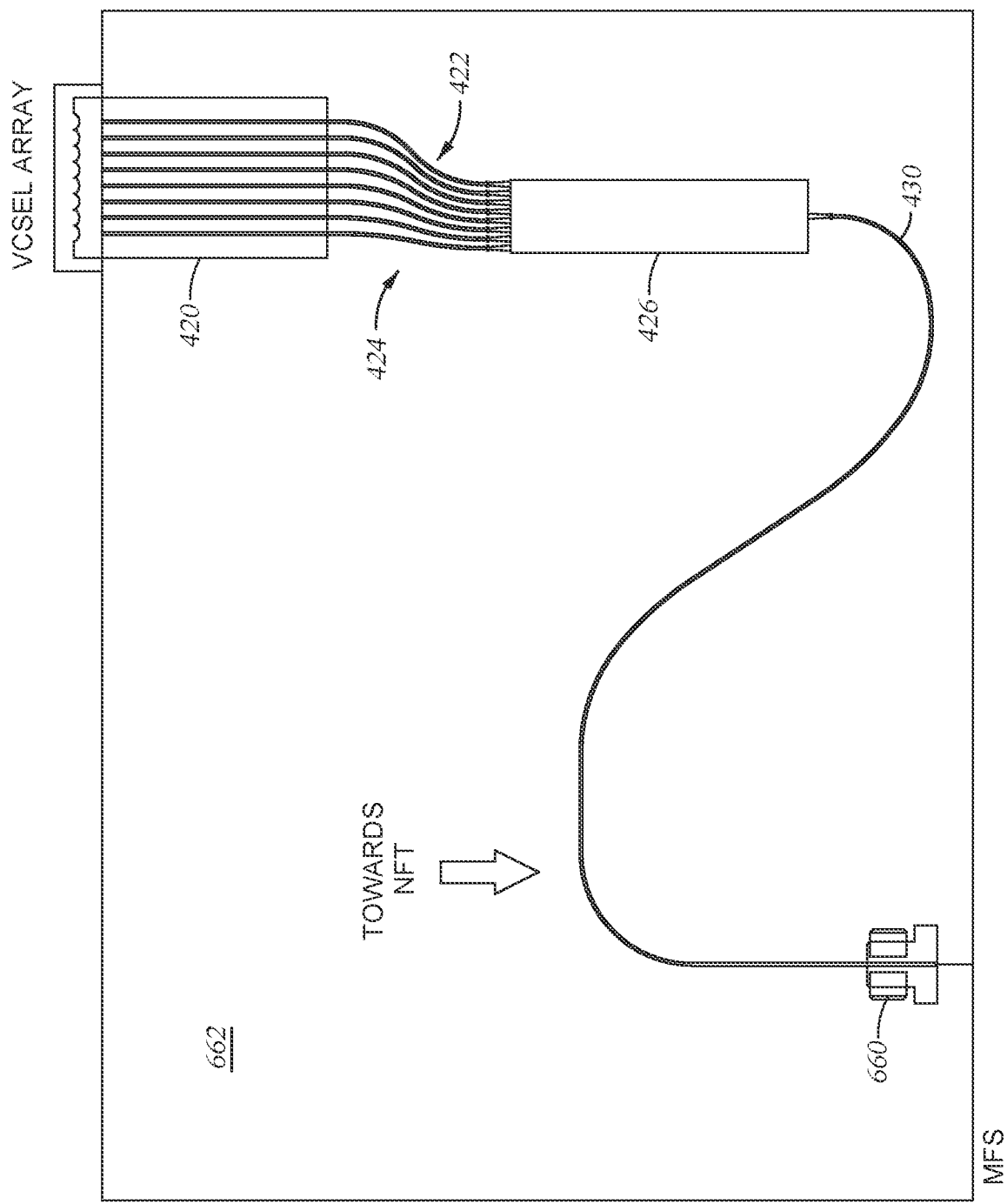
FIG. 6 illustrates a layout design for a waveguide structure comprising a mode converter, channels, and MMI combiner, according to one embodiment.

FIG. 6 illustrates a vertical design layout 600 for a waveguide structure comprising the mode converter 420, channels 422a-422h, and MMI combiner 426 disposed on a slider 662, according to one embodiment. The vertical design layout 600 of FIG. 6 illustrates an 8×1 array; however, the vertical design layout 600 may be used with any array, such as a 4×1, a 10×1, a 16×1, or a 32×1, for example.

In the vertical design layout 600, the mode converter 420, channels 422a-422h, and MMI combiner 426 are all vertical arranged (i.e., in the y-direction) on the slider 662, as similarly shown in FIGS. 4A-4D. The S-bend length, the S-bend curvature, and the total propagation length of each channel 422 are each optimized for the vertical design layout 600. The waveguide 430 from the MMI combiner 426 then curves back up in the y-direction and over in the—x-direction before extending down in the—y-direction to the NFT 660. As such, the waveguide 430 has a larger path length to the NFT 660.

Figure 7:
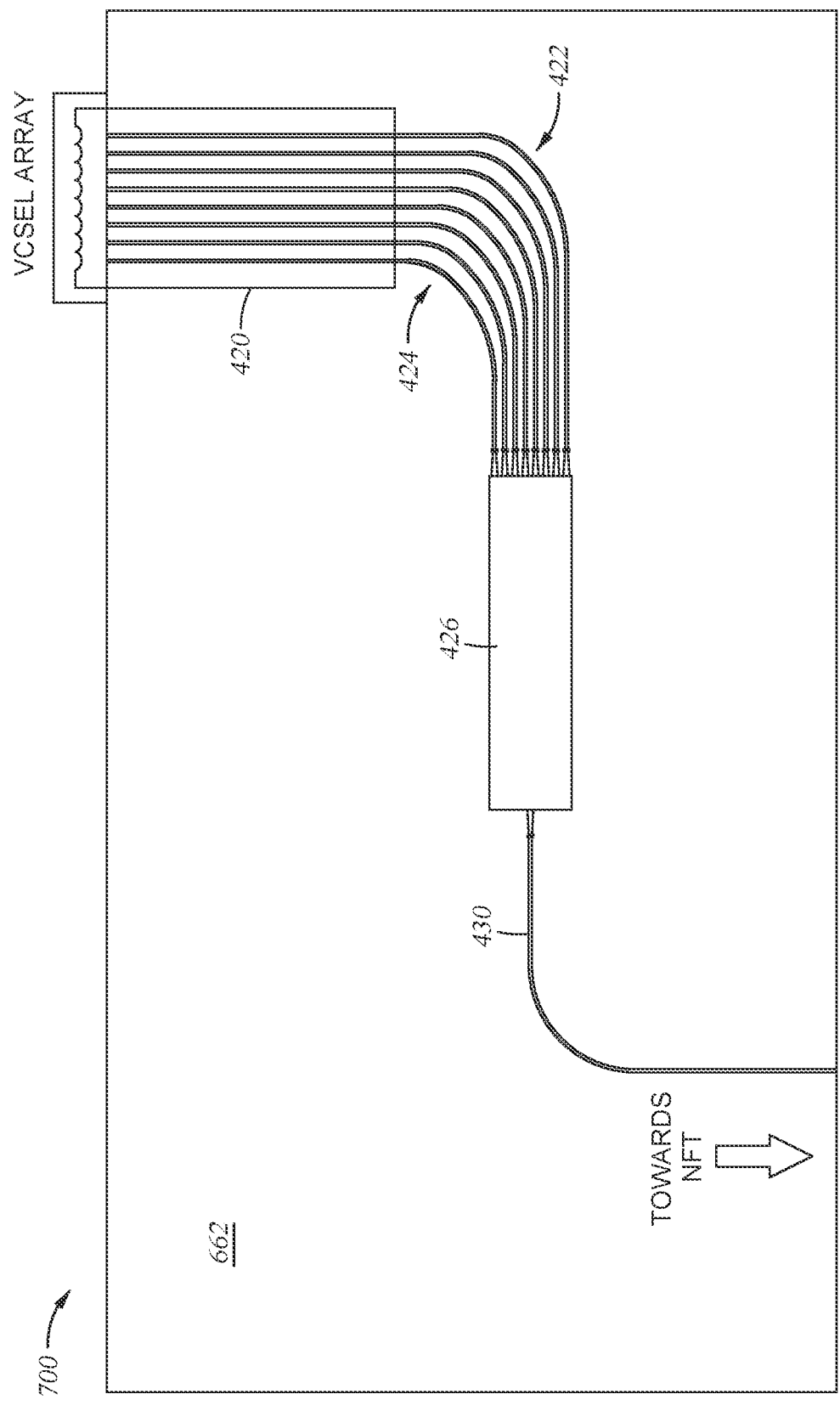
FIG. 7 illustrates a layout design for a waveguide structure comprising a mode converter, channels, and MMI combiner, according to another embodiment.

FIG. 7 illustrates a perpendicular design layout 700 for a waveguide structure comprising the mode converter 420, channels 422a-422h, and MMI combiner 426 disposed on a slider 662, according to one embodiment. The perpendicular design layout 700 of FIG. 7 illustrates an 8×1 array; however, the perpendicular design layout 700 may be used with any array, such as a 4×1, a 10×1, a 16×1, or a 32×1, for example.

In the perpendicular design layout 700, the mode converter 420 is disposed in the y-direction on the slider 662, and the MMI combiner 426 is disposed perpendicular to the mode converter 420 in the x-direction on the slider 662. The channels 422 extend in both the x-direction and the y-direction from the mode converter 420 to the MMI combiner 426. While the channels 422 do not have an "S-bend", the channels still have a bend curvature and a bend length. The bend length, the bend curvature, and the total propagation length of each channel 422 are each optimized for the perpendicular design layout 700. Thus, one or more of the bend length, the bend curvature, and the total propagation length of each channel 422 are different from that of the vertical design layout 600 of FIG. 6. The waveguide 430 from the MMI combiner 426 then curves over in the—x-direction and down in the—y-direction to the NFT (not shown). As such, the waveguide 430 has a smaller path length to the NFT than the waveguide 430 of FIG. 6. In other words, the mode converter 420, channels 422a-422h, and MMI combiner 426 have a reduced overall footprint in the vertical direction as compared to the vertical design layout 600.

Figure 8:
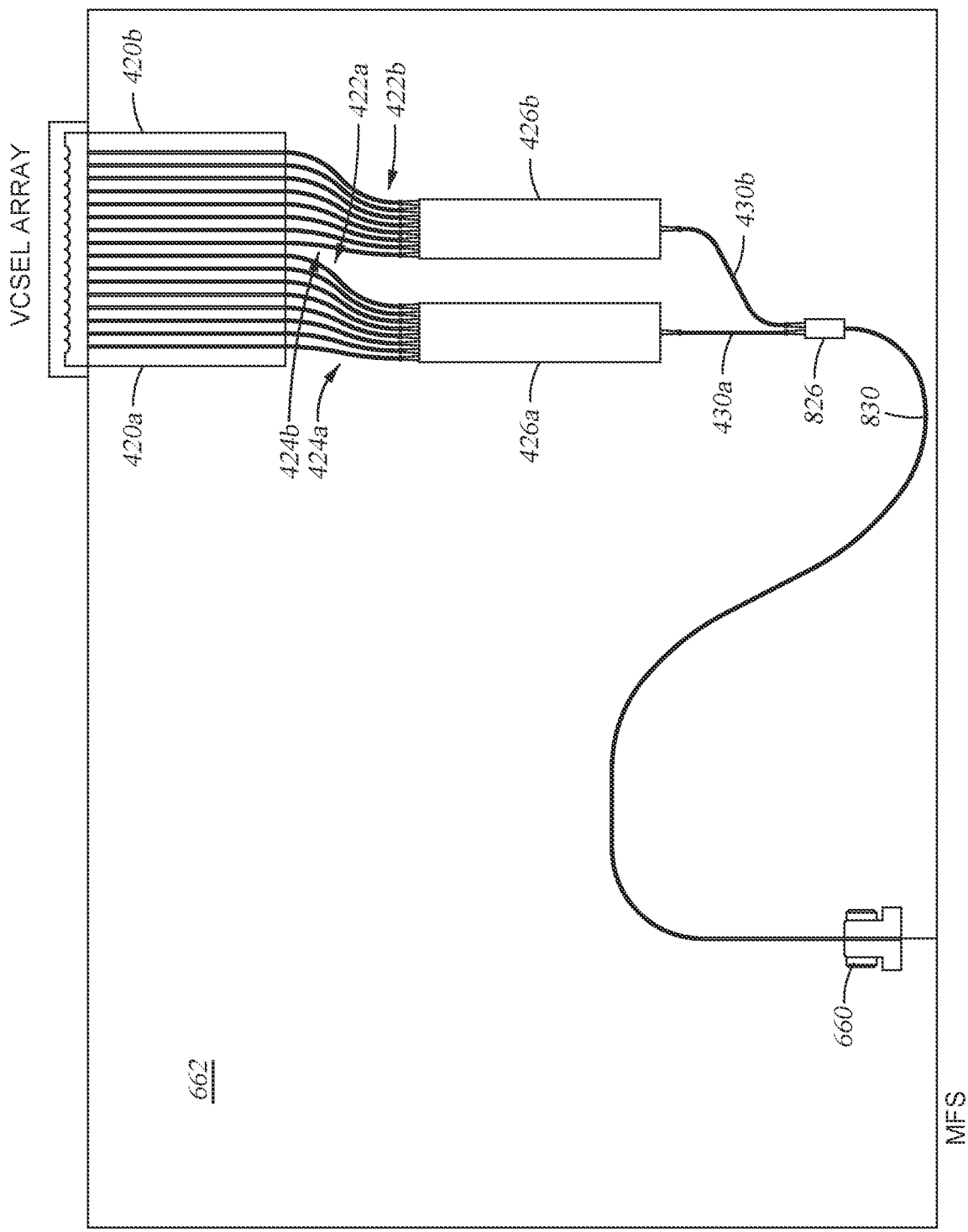
FIG. 8 illustrates a 16×1 layout design for a waveguide structure comprising a mode converter, channels, and MMI combiner, according to one embodiment.

FIG. 8 illustrates a 16×1 array design layout 800 for a waveguide structure, according to one embodiment. While a 16×1 array is illustrated in FIG. 8, the design layout 800 may be utilized with any array, such as a 20×1 array or a 32×1 array, for example.

The design layout 800 is similar to the vertical design layout 600 of FIG. 6; however, the design layout 800 comprises 16 channels rather than 8. As such, the design layout 800 comprises a first mode converter 420a and a first MMI combiner 426a coupled together by 8 first channels 422a (e.g., a first 8×1 array), and a second mode converter 420b and a second MMI combiner 426b coupled together by 8 second channels 422b (e.g., a second 8×1 array). The first mode converter 420a is disposed adjacent to the second mode converter 420b in the x-direction, the first channels 422a are disposed adjacent to the second channels 422b in the x-direction, and the first MMI combiner 426a is disposed adjacent to the second MMI combiner 426b in the x-direction.

A first waveguide 430a extends from the first MMI combiner 426a to a third MMI combiner 826, and a second waveguide 430b extends from the second MMI combiner 426b to the third MMI combiner 826. The third MMI combiner 826 then combines the power from the first MMI combiner 426a and the second MMI combiner 426b together to achieve the combined power for the 16 laser beams of the 16×1 array. A third waveguide 830 then extends from the third MMI combiner 826 back up in the y-direction and over in the—x-direction before extending down in the—y-direction to the NFT 660.

Figure 9:
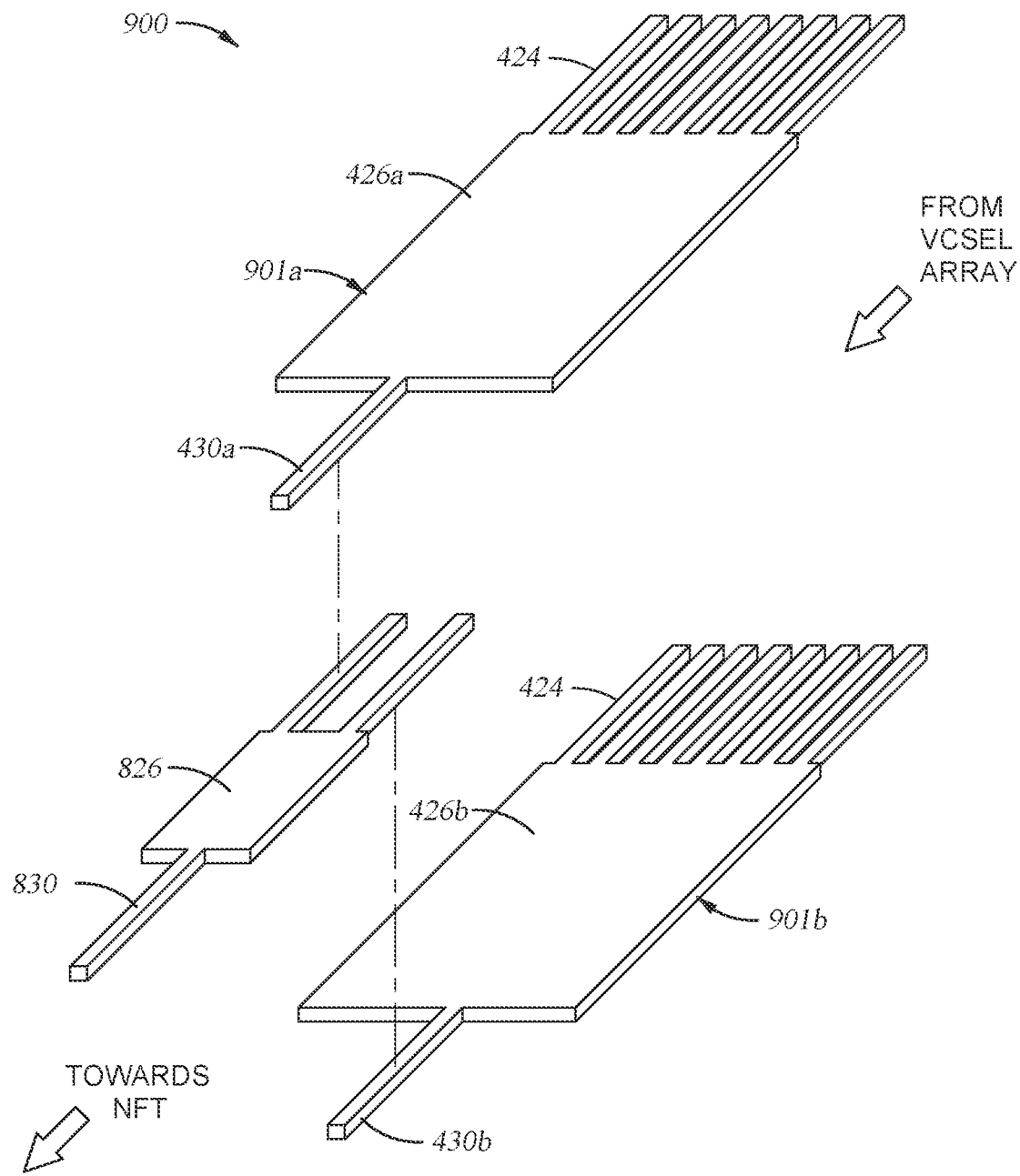
FIG. 9 illustrates a 8×2 layout design for a waveguide structure comprising a mode converter, channels, and MMI combiner, according to one embodiment.

FIG. 9 illustrates an 8×2 array design layout 900 for a waveguide structure, according to one embodiment. The 8×2 design layout 900 of FIG. 9 may be used with any array, such as a 4×2, a 10×2, or a 16×2, for example. In the 8×2 array, a first 8×1 array 901a is vertical stacked and aligned (i.e., in the y-direction) on top of a second 8×1 array 901b such that the 8×2 array is multi-dimensional. While not shown, both the first 8×1 array 901a and the second 8×1 array 901b comprise mode converter 420.

Similar to FIG. 8, once the first MMI combiner 426a of the first 8×1 array 901a combines the power of the laser beams input into the first MMI combiner 426a, and the second MMI combiner 426b of the second 8×1 array 901b combines the power of the laser beams input into the second MMI combiner 426b, a first waveguide 430a of the first 8×1 array 901 and a second waveguide 430b of the second 8×1 array each extend to a third MMI combiner 826 to combine the power of the laser beams from the first 8×1 array 901a and the second 8×1 array 901b together. A third waveguide 830 then extends from the third MMI combiner 826 to the NFT (not shown).

Therefore, by optimizing the S-bend length, S-bend curvature, and total propagation length, among other varied parameters, of the channels extending between a mode converter and a MMI combiner, the laser beams input into the MMI combiner through the channels are all phase coherent with respect to one another, ensuring maximum waveguide power is output from the MMI combiner through the NFT to a media.

VCSELs have a number of significant advantages for use as the light source in HAMR. The edge emitting laser diode (EELD) used today is typically mounted to a sub-mount because it is difficult to bond the edge-emitting facet face of the laser directly to the top of the slider. This sub-mount is then bonded to the slider. A VCSEL can easily have bonding electrodes on the surface-emitting face which match to corresponding electrodes on the top surface of the slider. These electrodes can be bonded together by laser-assisted solder reflow and can also serve as electrical connections for energizing the laser. By eliminating the need for a sub-mount, the light source cost can be significantly reduced. The VCSEL laser facet is made in a wafer level process which further lowers cost relative to EELDs. A VCSEL output beam is also larger and more circular than that of an EELD which increases the alignment tolerance and coupling efficiency to the slider spot size convertor. VCSELs are known to have higher reliability than EELDs due to larger, less intense optical mode and the wafer facet process. As a result, VCSELs do not require burn-in during manufacturing which further lowers cost. Since the VCSEL cavity length is shorter than EELDs, and because the laser is mounted on top of the slider, the lower overall height allows for a reduced disk-to-disk spacing, potentially more disks, and for higher HDD capacity.

Further, VCSELs have mode hop-free operation due to very short cavity length with one longitudinal mode and DBR mirror selectivity while EELDs suffer from mode hops. Mode hopping can cause a small (typically 1-2%) change in laser power to suddenly occur during the recording process. The possibility of a track width change and bit shift must be accounted for, which reduces the capacity of the HDD.

The primary technical issue with VCSELs is the relatively low output power relative to EELDs. Multimode VCSELs can have larger output power than single mode VCSELs but single mode operation is required by the waveguides and NFTs that are used to create the heat spot in the disk for HAMR. Single mode VCSELs typically have only about 2 mW of maximum output power, far short of the 10-20 mW needed for HAMR. The output cannot be efficiently increased by combining the outputs from multiple separate VCSELs because of decoherence between the wave fronts. If the active region of adjacent VCSELs are brought very close together, the wave functions will overlap enough to create coupling and phase coherence between their outputs. With the right VCSEL design and light delivery scheme, these outputs may be combined into a single waveguide with the necessary 5-10 mW of single mode power needed by the NFT for HAMR.

In one embodiment, a magnetic recording head assembly comprises a main pole, a NFT disposed adjacent to the main pole at a media facing surface, a VCSEL device coupled to a top surface of the magnetic recording head assembly, the top surface opposite a media facing surface of the magnetic recording head assembly, and a waveguide structure coupled between the NFT and the VCSEL device, the waveguide structure comprising: a waveguide coupled to the NFT, a MMI combiner having a first end coupled to the waveguide, and a plurality of waveguide channels coupled to a second end the MMI combiner opposite the first end of the MMI combiner, wherein each of the plurality of waveguide channels has a different curvature such that each of the plurality of waveguide channels is phase coherent with adjacent waveguide channels.

The VCSEL is capable of emitting a plurality of lasers through the plurality of waveguide channels. The magnetic recording head assembly further comprises a mode converter having a first end coupled to the VCSEL device and a second end opposite the first end of the mode converter coupled to the plurality of waveguide channels. Each of the plurality of waveguide channels has a different length. Waveguide channels having a greater S-bend length have a greater propagation length. Each of the plurality of waveguide channels has a same spatial length. A magnetic media drive comprises the magnetic recording head assembly.

In another embodiment, a magnetic recording head assembly comprises a main pole, a NFT disposed adjacent to the main pole at a media facing surface, a VCSEL device coupled to a top surface of the magnetic recording head assembly, the top surface opposite a media facing surface of the magnetic recording head assembly, and a waveguide structure coupled between the NFT and the VCSEL device, the waveguide structure comprising: a mode converter having a first end coupled to the VCSEL device, a MMI combiner disposed adjacent to the mode converter, a plurality of waveguide channels coupled between a first end the MMI combiner and a second end of the mode converter opposite the first end of the mode converter, wherein a path length of each of the plurality of waveguide channels is configured such that a phase of each of the plurality of waveguide channels is controllable, and a waveguide coupled between a second end of the MMI combiner opposite the first end of the MMI combiner and the NFT.

Each of the plurality of waveguide channels has a different bend length and a different bend curvature. Each of the plurality of waveguide channels has a radius of curvature greater than about 20 µm. Waveguide channels having a greater radius of curvature have a greater propagation length. The VCSEL is capable of emitting a plurality of lasers, the plurality of lasers being phase coherent when traveling through the plurality of waveguide channels into the first end of the MMI combiner. The MMI combiner combines a power of each of the plurality of lasers. The MMI combiner and the mode converter are vertical aligned. The MMI combiner is disposed perpendicular to the mode converter. A magnetic media drive comprises the magnetic recording head assembly.

In yet another embodiment, a magnetic recording head assembly comprises a main pole, a NFT disposed adjacent to the main pole at a media facing surface, a VCSEL device coupled to a top surface of the magnetic recording head assembly, the top surface opposite a media facing surface of the magnetic recording head assembly, and a first waveguide structure coupled between the NFT and the VCSEL device, the first waveguide structure comprising: a plurality of first waveguide channels, each of the plurality of first waveguide channels having at least one of a different curvature and a different propagation length, wherein the VCSEL is capable of emitting a first plurality of lasers through the plurality of first waveguide channels, a first MMI combiner having a first end coupled to the plurality of first waveguide channels, wherein the first plurality of lasers emitted through the plurality of first waveguide channels are phase coherent when input into the first MMI combiner, and wherein the first MMI combiner combines a power of each of the first plurality of lasers into a first total power, and a first waveguide coupled to a second end of the first MMI combiner opposite the first end of the first MMI combiner.

The magnetic recording head assembly further comprises a second waveguide structure disposed adjacent to the first waveguide structure, the second waveguide structure comprising: a plurality of second waveguide channels, each of the plurality of second waveguide channels having at least one of a different curvature and a different propagation length, wherein the VCSEL is capable of emitting a second plurality of lasers through the plurality of second waveguide channels, a second MMI combiner having a first end coupled to the plurality of second waveguide channels, wherein the second plurality of lasers emitted through the plurality of second waveguide channels are phase coherent when input into the second MMI combiner, and wherein the second MMI combiner combines a power of each of the second plurality of lasers into a second total power, and a second waveguide coupled to a second end of the second MMI combiner opposite the first end of the second MMI combiner.

The magnetic recording head assembly further comprises a third MMI combiner having a first end coupled to the first waveguide and the second waveguide, wherein the third MMI combiner combines a power of the first total power and the second total power into a third total power, and a third waveguide coupled between a second end of the third MMI combiner opposite the first end of the third MMI combiner and the NFT. The first waveguide structure and the second waveguide structure are multi-dimensional. A magnetic media drive comprises the magnetic recording head assembly.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head assembly, comprising:
   a main pole;
   a near field transducer (NFT) disposed adjacent to the main pole at a media facing surface;
   a vertical cavity surface emitting laser (VCSEL) device coupled to a top surface of the magnetic recording head assembly, the top surface opposite a media facing surface of the magnetic recording head assembly; and
   a waveguide structure coupled between the NFT and the VCSEL device, the waveguide structure comprising:
      a waveguide coupled to the NFT;
      a multimodal interference (MMI) combiner having a first end coupled to the waveguide; and
      a plurality of waveguide channels coupled to a second end the MMI combiner opposite the first end of the MMI combiner, wherein each of the plurality of waveguide channels has a different curvature such that each of the plurality of waveguide channels is phase coherent with adjacent waveguide channels.

2. The magnetic recording head assembly of claim 1, wherein the VCSEL is capable of emitting a plurality of lasers through the plurality of waveguide channels.

3. The magnetic recording head assembly of claim 1, further comprising a mode converter having a first end coupled to the VCSEL device and a second end opposite the first end of the mode converter coupled to the plurality of waveguide channels.

4. The magnetic recording head assembly of claim 1, wherein each of the plurality of waveguide channels has a different optical path length.

5. The magnetic recording head assembly of claim 4, wherein waveguide channels having a greater S-bend length have a greater propagation length.

6. The magnetic recording head assembly of claim 1, wherein each of the plurality of waveguide channels has a same spatial length.

7. A magnetic media drive comprising the magnetic recording head assembly of claim 1.

8. A magnetic recording head assembly, comprising:
   a main pole;
   a near field transducer (NFT) disposed adjacent to the main pole at a media facing surface;
   a vertical cavity surface emitting laser (VCSEL) device coupled to a top surface of the magnetic recording head assembly, the top surface opposite a media facing surface of the magnetic recording head assembly; and
   a waveguide structure coupled between the NFT and the VCSEL device, the waveguide structure comprising:
      a mode converter having a first end coupled to the VCSEL device;
      a multimodal interference (MMI) combiner disposed adjacent to the mode converter;

a plurality of waveguide channels coupled between a first end the MMI combiner and a second end of the mode converter opposite the first end of the mode converter, wherein a path length of each of the plurality of waveguide channels is configured such that a phase of each of the plurality of waveguide channels is controllable; and a waveguide coupled between a second end of the MMI combiner opposite the first end of the MMI combiner and the NFT.

9. The magnetic recording head assembly of claim 8, wherein each of the plurality of waveguide channels has a different path length and a different bend curvature.

10. The magnetic recording head assembly of claim 8, wherein each of the plurality of waveguide channels has a radius of curvature greater than about 20 μm, and wherein waveguide channels having a greater radius of curvature have a greater propagation length.

11. The magnetic recording head assembly of claim 8, wherein the VCSEL is capable of emitting a plurality of lasers, the plurality of lasers being phase coherent when traveling through the plurality of waveguide channels into the first end of the MMI combiner.

12. The magnetic recording head assembly of claim 11, wherein the MMI combiner combines a power of each of the plurality of lasers.

13. The magnetic recording head assembly of claim 8, wherein the MMI combiner and the mode converter are vertical aligned.

14. The magnetic recording head assembly of claim 8, wherein the MMI combiner is disposed perpendicular to the mode converter.

15. A magnetic media drive comprising the magnetic recording head assembly of claim 8.

16. A magnetic recording head assembly, comprising:
a main pole;
a near field transducer (NFT) disposed adjacent to the main pole at a media facing surface;
a vertical cavity surface emitting laser (VCSEL) device coupled to a top surface of the magnetic recording head assembly, the top surface opposite a media facing surface of the magnetic recording head assembly; and
a first waveguide structure coupled between the NFT and the VCSEL device, the first waveguide structure comprising:
 a plurality of first waveguide channels, each of the plurality of first waveguide channels having at least one of a different curvature and a different propagation length, wherein the VCSEL is capable of emitting a first plurality of lasers through the plurality of first waveguide channels;
 a first multimodal interference (MMI) combiner having a first end coupled to the plurality of first waveguide channels, wherein the first plurality of lasers emitted through the plurality of first waveguide channels are phase coherent when input into the first MMI combiner, and wherein the first MMI combiner combines a power of each of the first plurality of lasers into a first total power; and
 a first waveguide coupled to a second end of the first MMI combiner opposite the first end of the first MMI combiner.

17. The magnetic recording head assembly of claim 16, further comprising a second waveguide structure disposed adjacent to the first waveguide structure, the second waveguide structure comprising:
a plurality of second waveguide channels, each of the plurality of second waveguide channels having at least one of a different curvature and a different propagation length, wherein the VCSEL is capable of emitting a second plurality of lasers through the plurality of second waveguide channels;
a second MMI combiner having a first end coupled to the plurality of second waveguide channels, wherein the second plurality of lasers emitted through the plurality of second waveguide channels are phase coherent when input into the second MMI combiner, and wherein the second MMI combiner combines a power of each of the second plurality of lasers into a second total power; and
a second waveguide coupled to a second end of the second MMI combiner opposite the first end of the second MMI combiner.

18. The magnetic recording head assembly of claim 17, further comprising:
a third MMI combiner having a first end coupled to the first waveguide and the second waveguide, wherein the third MMI combiner combines a power of the first total power and the second total power into a third total power; and
a third waveguide coupled between a second end of the third MMI combiner opposite the first end of the third MMI combiner and the NFT.

19. The magnetic recording head assembly of claim 17, wherein the first waveguide structure and the second waveguide structure are multi-dimensional.

20. A magnetic media drive comprising the magnetic recording head assembly of claim 16.

* * * * *